UNITED STATES PATENT OFFICE.

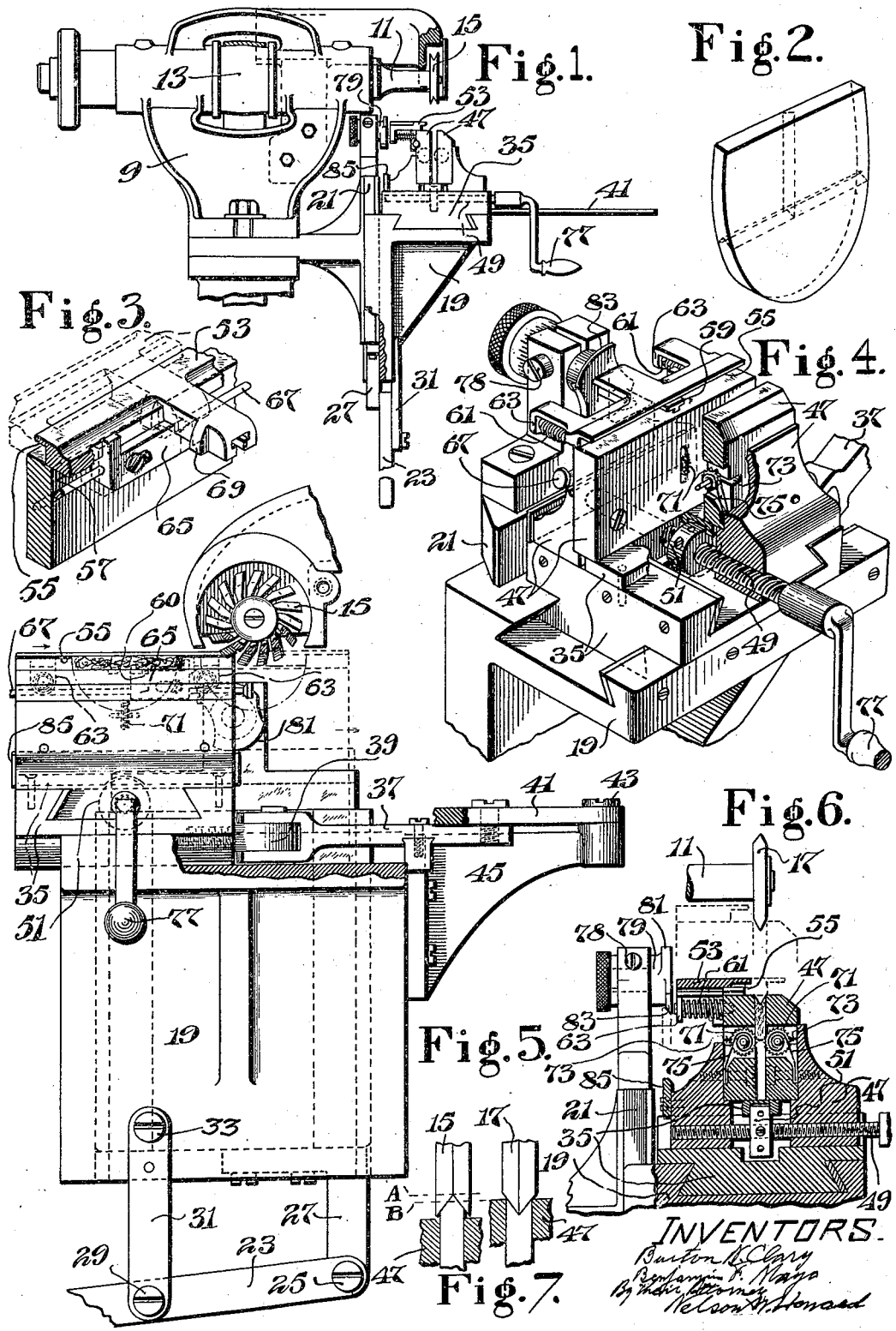

BURTON N. CLARY, OF BEVERLY, AND BENJAMIN F. MAYO, OF SALEM, MASSACHUSETTS, ASSIGNORS TO UNITED SHOE MACHINERY CORPORATION, OF PATERSON, NEW JERSEY, A CORPORATION OF NEW JERSEY.

CUTTING MACHINE.

1,405,492.   Specification of Letters Patent.   Patented Feb. 7, 1922.

Application filed November 30, 1917. Serial No. 204,660.

*To all whom it may concern:*

Be it known that we, BURTON N. CLARY and BENJAMIN F. MAYO, citizens of the United States, and residents of Beverly and Salem, respectively, in the county of Essex and State of Massachusetts, have invented certain Improvements in Cutting Machines, of which the following description, in connection with the accompanying drawings, is a specification, like reference characters on the drawings indicating like parts in the several figures.

This invention relates to machines for use in the manufacture of pieced articles, and is herein illustrated as embodied in a machine for use in the manufacture of pieced top lifts for the heels of boots and shoes.

In the manufacture of pieced lifts it is customary to form complementary faces on the edges of the pieces of stock so that said pieces may be firmly united by glue; and the present invention is illustrated as embodied in a machine for forming such faces.

The complementary faces produced by the present machine are respectively salient and re-entrant for the formation of which two different tools are required; and one feature of the invention comprises a tool carrier, herein shown as a rotary spindle, to which either tool may be fastened, a holder for a piece of stock, and means for positioning the stock differently in the holder according to whether one or the other tool is being used, thus obviating the necessity for using two separate sets of tools and holders to produce the two complementary faces.

In forming a re-entrant edge or groove upon a piece of stock, it is necessary to cause the cutter to produce a wider and deeper cut on a thick piece than upon a thin piece in order that there may be a smooth joint between such a piece and a piece having a complementary edge when the two pieces are joined. To this end another feature of the invention comprises, in a machine for cutting a groove in a piece of stock, means responsive to a characteristic of the stock for controlling a characteristic of the groove. In the illustrative machine the width and depth of the groove are controlled by the thickness of the stock.

A further feature of the invention relates to a holder for a piece of stock comprising a clamp between the jaws of which the stock may be placed, and means for positioning the stock while the clamp is being tightened. This construction facilitates the proper placing of the stock in the holder and ensures that the edge of the stock shall be accurately alined preparatory to being operated upon.

These and other features of the invention, including certain details of construction and combinations of parts will be described as embodied in an illustrative machine and pointed out in the appended claims.

Referring now to the accompanying drawings,—

Fig. 1 is an elevation of a machine in which the present invention is embodied;

Fig. 2 is a perspective of a pieced lift, the joined edges of the pieces of which have been shaped on the machine;

Fig. 3 is a perspective of the gage and its mounting;

Fig. 4 is a perspective of the clamp and the gage;

Fig. 5 is an elevation of the machine showing the formation of a salient edge on a piece of stock;

Fig. 6 is a view, partly in section and partly in elevation, showing the formation of a re-entrant edge on a piece of stock, and Fig. 7 is a sectional view of the two cutters and two pieces of stock.

The machine comprises a head 9 in which is rotatably mounted a spindle or tool carrier 11 having a pulley 13 by which power may be applied and provided at one end with a seat to receive a cutter. In Figs. 1 and 5 a cutter 15 having a re-entrant edge is shown while in Fig. 6 a cutter 17 having a salient edge is shown; and it will be understood that either form of cutter may be used. A vertically movable slide 19 mounted in vertical slideways 21 may be raised and lowered by means of a hand lever 23 pivoted at one end at 25 to a stationary lug 27 and intermediate its ends at 29 to the lower end of a link 31 the upper end of which is pivoted at 33 to the slide 19. By manipulating the lever 23 the slide may be raised and lowered.

Horizontally slidable in an undercut groove on the slide 19 is a second slide 35, movement being imparted to this second slide through a link 37 pivoted at one end to a lug 39 on the slide and at the other to a hand lever 41, said lever in turn being pivoted at its end at 43 to a bracket 45 carried by the vertically movable slide 19. Slidable in an undercut groove on the slide 35 in a direction at right angles to the direction of movement of said slide are the jaws 47 of a clamp adapted to hold the piece of stock during the cutting operation. In the illustrative construction each jaw comprises a base and a stock-contacting portion fastened together by screws. A right and left screw 49 is threaded through the bases of the jaws 47 and has fast to its middle portion a collar 51 which runs in a groove formed in the under side of a bar; said bar being fast to and practically a part of the slide 35. With the construction thus far described it will be evident that a piece of stock clamped between the jaws 47 may be moved vertically until a position has been reached in which the desired depth of cut will be made and may then be moved horizontally to cause it to travel past the cutter.

Before proceeding to describe the means for locating the piece of stock in the jaws of the clamp and for limiting the approach of the clamp to the cutter, attention is directed to Fig. 7. At 15 and 17 are shown portions of the two matching cutters, these cutters being of the same diameter and of a width equal to or greater than that of the thickest stock which is to be operated upon. It will be clear that when the cutter 15 is being used the stock must project above the jaws 47 and that when the cutter 17 is being used the top edge of the stock should be flush with tops of the jaws so as to prevent distortion of the stock during the action of the cutter. Aside from this difference in the position of the two pieces of stock with reference to the jaws, it is necessary to limit the approach of the stock to the cutters differently in the two cases. Referring first to the cutter 15, it will be seen that each piece of stock should be moved up to the level indicated by the broken line A in order to have the proper shape imparted to its edge but that a piece of stock of the same thickness as the first when presented to the cutter 17, should be moved up only to the level of the broken line B. In other words, each piece of stock, irrespective of its thickness, which is presented to the cutter 15 should be moved up to the a fixed limit represented by the line A, but the limit of upward movement of each piece of stock presented to the cutter 17 should vary with the thickness of the piece and in general should be below the limit fixed for the cutter 15.

In order to provide for these conditions suitable means are provided for limiting the upward movement of the clamp and for positioning the stock in the jaws thereof. To these ends a gage 53 having an upper face 55 and a lower face 57 is so mounted that either face may be moved over the mouth of the clamp to limit the extent to which the edge of the piece of stock shall project above the tops of the jaws 47. This gage is slidable on a T-shaped guide 59 formed on one of the jaws 47 and is normally held in inoperative position, as shown in the full line position in the figures, by springs 61 each spring being coiled around a pin, which is carried by the jaw, and abutting with one end the jaw and with the other end the downwardly extending part of a tail 63 which is integral with the gage and slides on the pin. In order to facilitate moving the gage so as to bring either the face 55 or the face 57 over the mouth of the clamp as may be desired, a stop 65, slidable on the jaw 47 may be moved by a rod 67 into or out of the path of a lug 69 on the gage. When the stop is in the full line position shown in Fig. 3 and the gage is pushed forward in opposition to the springs 61, the face 55 will be brought into position over the mouth of the clamp; and when the stop is pulled back into the dotted line position, the face 57 will be brought over the mouth of the clamp.

In order to push the piece of stock upwardly and to hold its upper edge in contact with the gage while the clamp is being tightened, two ratchet wheels 71 located in recesses in the jaws 47 have trunnions which are rotatable and slidable in grooves 73 formed in said jaws, and coiled springs 75 fastened at their inner ends to the wheels have free ends which extend into narrow sockets formed in the jaws. The effect of this construction is to tend to push the stock out of the jaws and to hold its upper edge in contact with the gage. The procedure is to push the piece of stock down into the mouth of the clamp with its upper edge below the tops of the jaws thereby winding up the coiled springs. The screw 49 is then turned by means of the handle 77 to tighten the clamp upon the stock. The gage 53 is then moved to bring the face 55 or the face 57, as may be desired, over the mouth of the clamp, and the clamp loosened. The wheels 71, under the action of the springs, then force the stock upwardly thereby causing the upper edge of the stock to be properly alined and the stock to be positioned properly in the clamp. The clamp is then tightened again, and the gage released.

In order to ensure that the pieces upon which salient edges are to be formed shall always rise to the level indicated by the line A and that the pieces upon which re-entrant edges are to be formed shall rise to a level dependent upon their thickness, the following mechanism is provided. Mounted upon a stem which is held in adjusted angular position in a bore in the frame of the machine by a pinch screw 78 is a stop 79 having two operative faces 81 and 83. Both faces are eccentric to the axis of the stop for purposes of adjustment but the face 81 is of the same height all the way across at every point and, once it has been adjusted, acts as would a flat face, while the face 83 is beveled. In order to promote brevity the faces will be referred to respectively as flat and beveled, the flat face 81 being used in the production of salient edges and the beveled face 83 in the production of re-entrant edges. Arranged to co-operate with these stop faces is a stop member 85 fast to one of the jaws 47, said member having a flat horizontal face adapted to contact with the flat face 81 and a beveled face adapted to contact with the beveled face 83. When, therefore, the face 81 is in its operative position, as shown in Figs. 4 and 5, the upward movement of the clamp is limited to a fixed position, but when the beveled face 83 is in operative position, as shown in Fig. 5, the limit of upward movement of the clamp varies directly with the thickness of the stock, the thicker the stock the nearer to the cutter the clamp will be moved, and the deeper and wider will be the groove in the re-entrant face which is produced.

The operation of the machine is as follows: The lever 41 is manipulated to move the clamp to one side of the cutter. A piece of stock is pushed down between the jaws 47 of the clamp, and the gage 53 pushed over the mouth of the clamp and held in that position while the crank 77 is being turned to cause the jaws to grip the stock. The gage is released whereupon the springs 61 move it to inoperative position; the lever 23 is lifted until the stop member 85 contacts with the flat face 81 or the beveled face 83 and held in that position; and the lever 41 is manipulated to move the stock horizontally into the path of and past the cutter. This completes the cutting of the piece. To get the piece out of the machine, the lever 23 is lowered. The crank 77 is then manipulated to cause the grip of the jaws upon the stock to be released whereupon the springs 75, being still under tension, operate the wheels 71 to cause them to eject the piece of stock or to push it upwardly a sufficient distance to permit it to be grasped readily.

Although the invention has been set forth as embodied in a particular machine, it should be understood that the invention is not limited in the scope of its application to the particular machine which has been shown and described.

Having thus described my invention, what I claim as new and desire to secure by Letters Patent of the United States is:

1. A machine of the class described, having, in combination, a tool carrier, a holder for a piece of stock, means for producing relative movement between the holder and the carrier, and a gage for positioning the stock in the holder, said gage having two faces differently located with respect to the holder either of which may be brought into operative relation to the holder.

2. A machine of the class described, having, in combination, a tool carrier, a clamp between the jaws of which the piece of stock is held, and a two-faced gage for positioning the stock with its edge to be operated upon projecting from the jaws of the clamp or flush with the tops of said jaws as may be desired.

3. A machine of the class described, having, in combination, a tool carrier, a holder for a piece of stock, means for producing relative movement between the holder and the carrier, a gage for positioning the stock in the holder, and yielding means tending to hold the gage in and to return it to inoperative position.

4. In an apparatus for performing a plurality of operations upon material, operating means, means for holding the material, means for producing relative movement of approach between the holding means and the operating means, and a gage for positioning the material in the holding means, said gage having a plurality of faces with which the material may contact to position it differently in the holding means for different operations.

5. A machine of the class described, having, in combination, a carrier to which may be fastened either one of two cutters having cutting faces adapted to produce upon the edges of two pieces of stock respectively a salient and a re-entrant face by which the pieces may be joined, a holder for the stock, means for producing relative movement between the carrier and the holder to cause the stock to be operated upon, and means for positioning the piece of stock differently in the holder according to whether a salient or re-entrant face is to be produced.

6. A machine of the class described having, in combination, a spindle to which may be fastened either one of two cutters having cutting faces adapted to produce upon the edges of two pieces of stock respectively a salient and a re-entrant face by which the pieces may be joined, a clamp for holding the piece of stock, means for producing relative movement between the spindle and the clamp to cause the stock to be operated upon, means for positioning the pieces of stock differently for the different cutters, and means for limiting the relative movement in such manner that the area of the faces produced, whether salient or re-entrant, will be equal for pieces of stock of the same thickness.

7. A machine of the class described, having, in combination, a spindle to which may be fastened either one of two cutters having cutting faces adapted to produce upon the edge of two pieces of stock respectively a salient and a re-entrant face by which the pieces may be joined, a clamp for holding the pieces of stock, means for producing relative movement toward each other of the spindle and the clamp, and means for limiting this approach to a given relative position of the clamp and the spindle when the salient face is to be produced and for limiting it to a different relative position when the re-entrant face is to be produced.

8. A machine of the class described, having, in combination, means for progressively making a cut at the edge of a piece of stock, and means responsive to a dimension of the stock for controlling the making of the cut.

9. A machine of the class described, having, in combination, means for cutting a groove in the edge of a piece of stock, and means responsive to a dimension of the stock for controlling a dimension of the groove.

10. A machine of the class described, having, in combination, means for cutting a groove in the edge of a piece of stock, and means responsive to a dimension of the stock for controlling the depth of the groove.

11. A machine of the class described, having, in combination, means for cutting a groove in the edge of a piece of stock, and means responsive to a dimension of the stock for controlling the width of the groove.

12. A machine of the class described, having, in combination, a tool for cutting into a piece of stock, a clamp for holding the stock during the cutting operation, means for producing relative movement between the tool and the clamp to cause the tool to enter the stock, and means responsive to the thickness of the stock for controlling the extent of the relative movement.

13. A machine of the class described, having, in combination, a tool for forming a groove in a piece of stock, a clamp for holding the stock during the cutting operation, means for producing relative movement between the tool and the clamp to cause the tool to enter the stock, and means whereby the extent of separation of the jaws of the clamp controls the extent of the relative movement.

14. A machine of the class described, having, in combination, a tool for operating upon a piece of stock, means for holding the stock during the operation of the tool, means for producing relative movement between the tool and the holding means, and stop members having co-operating faces constructed and arranged to limit the extent of the relative movement in accordance with a dimension of the stock.

15. A machine for shaping the edges of pieces of stock, having, in combination a cutting tool, a clamp, means for producing relative movement of approach between the clamp and the tool, a gage adapted to determine the position of the stock in the clamp, and means for holding the edge of the stock against the gage while the clamp is being tightened on the stock.

16. A machine for shaping the edges of pieces of stock, having, in combination, a cutting tool, a clamp, means for producing relative movement of approach between the clamp and the tool, a gage adapted to determine the position of the stock in the clamp, means for holding the edge of the stock against the gage while the clamp is being tightened on the stock, and means whereby the gage may be withdrawn from operative position after the clamp has been tightened.

17. A holder for a piece of stock comprising a pair of jaws arranged to clamp the stock between them, and means for determinately positioning a piece of stock placed between the jaws in one of a plurality of positions with respect to the distance of its edge from the edges of the jaws, preparatory to tightening the clamp.

18. A holder for a piece of stock comprising a pair of jaws, means for closing the jaws on the piece, a gage movable over the mouth of the clamp selectively to position the piece of stock in one of a plurality of determinate positions, and means for pushing the piece against the gage when the jaws are opened and for holding it in that position while the jaws are being closed again.

19. A holder for a piece of stock comprising a pair of jaws, a gage having a plurality of differently positioned stock engaging faces, any one of which may be moved into operative relation with respect to the mouth of said jaws, and means for pushing from the mouth of said jaws and for holding with its edge against a face of said gage a piece of work pushed into said mouth.

20. A holder for a piece of stock comprising a clamp, and means for locating the stock with respect to the jaws of the clamp, said means including a gage and means rendered effective by pushing the piece of stock between the jaws for holding the stock against the gage.

21. A holder for a piece of stock comprising a pair of jaws, a gage for determining the location of the stock with respect to the jaws, and means including a spring adapted to be put under tension by placing the stock between the jaws for holding the stock against the gage.

22. A holder for a piece of stock comprising a pair of jaws, a gage for determining the location of the stock with respect to the jaws, and means for moving the stock into engagement with the gage, said means including a wheel rotatably mounted in one of the jaws, and a coiled spring connected with said wheel and arranged to be wound up by pushing a piece of stock between the jaws.

23. A holder for a piece of stock comprising a pair of jaws, a gage for determining the location of the stock with respect to the jaws, a pair of opposed wheels rotatably mounted in the jaws and slidable toward and from each other, and coiled springs each having one end fastened to a wheel and the other end fastened to one of the jaws.

24. A machine for shaping the edges of pieces of stock, having, in combination, a cutting tool, a clamp between the jaws of which the piece of stock is held, a gage for positioning the stock in the clamp, means for producing relative movement between the cutting tool and the clamp to cause the edge of the stock to be shaped, and means for ejecting the stock when the clamp is released.

25. A machine of the class described, having, in combination, an operating tool, a support for a piece of stock, means for producing relative movement between the tool and the support, and a gage for positioning the piece of stock relatively to the support, said gage having two faces, differently located with respect to the tool, either of which may be brought into operative position, according to the desired operative relation of the piece of stock and the tool.

26. A holder for a piece of stock comprising a pair of clamping jaws, and means carried by said jaws for ejecting the piece of stock held thereby upon the unclamping of the jaws.

27. A holder for a piece of stock comprising a pair of clamping jaws, a wheel rotatably mounted in one of the jaws, and means arranged automatically to rotate the wheel to eject the piece of stock held by the jaws upon the unclamping of the jaws.

28. A holder for a piece of stock comprising a pair of clamping jaws, a wheel rotatably mounted in one of the jaws, and a spring arranged to rotate the wheel to eject the piece of stock held by the jaws upon the unclamping of the jaws.

29. A holder for a piece of stock comprising a pair of clamping jaws, a pair of opposed wheels rotatably mounted one in each of the jaws, and a pair of coiled springs, one connected to each of the wheels, arranged to rotate the wheels to eject the piece of stock held by the jaws upon the unclamping of the jaws.

30. A holder for a piece of stock comprising a pair of clamping jaws, and rotary means rendered effective by the insertion of said piece of stock and operative for ejection thereof upon unclamping said jaws.

In testimony whereof we have signed our names to this specification.

BURTON N. CLARY.
BENJAMIN F. MAYO.